(12) United States Patent
O'Connell et al.

(10) Patent No.: US 11,434,115 B2
(45) Date of Patent: Sep. 6, 2022

(54) TELESCOPING STABILIZATION STRUT SYSTEM

(71) Applicant: RESCUE 42, INC., Chico, CA (US)

(72) Inventors: Timothy O'Connell, Chico, CA (US); Brian Fredenberg, Chico, CA (US)

(73) Assignee: RESCUE 42, INC., Chico, CA (US)

( * ) Notice: Subject to any disclaimer, the term of this patent is extended or adjusted under 35 U.S.C. 154(b) by 585 days.

(21) Appl. No.: 16/273,966

(22) Filed: Feb. 12, 2019

(65) Prior Publication Data

US 2019/0248633 A1 Aug. 15, 2019

Related U.S. Application Data

(63) Continuation of application No. PCT/US2017/047037, filed on Aug. 15, 2017.

(60) Provisional application No. 62/375,497, filed on Aug. 16, 2016.

(51) Int. Cl.
*B66F 1/02* (2006.01)
*B66F 3/10* (2006.01)
*B66F 3/00* (2006.01)
*F16M 7/00* (2006.01)

(52) U.S. Cl.
CPC ............... *B66F 1/02* (2013.01); *B66F 3/00* (2013.01); *B66F 3/10* (2013.01); *F16M 7/00* (2013.01)

(58) Field of Classification Search
CPC ...... B66F 1/02; B66F 1/06; B66F 1/04; B66F 3/10; B66F 3/00; B60S 9/08; E04G 1/18; E04G 1/20
USPC .......................................... 254/105; 248/351
See application file for complete search history.

(56) References Cited

U.S. PATENT DOCUMENTS

| | | | | |
|---|---|---|---|---|
| 1,732,081 A | * | 10/1929 | Clement | B25H 1/0007 269/67 |
| 4,602,890 A | * | 7/1986 | Duda | F16B 7/105 403/105 |
| 4,842,311 A | * | 6/1989 | White | F16B 7/105 248/408 |
| 5,423,518 A | * | 6/1995 | Baxter | B60S 9/08 254/419 |
| 6,158,705 A | | 12/2000 | Cudmore | |
| 6,776,383 B2 | | 8/2004 | Lanka | |
| 7,240,885 B1 | | 7/2007 | Sullivan | |
| 8,113,479 B1 | * | 2/2012 | O'Connell | A62B 3/00 248/351 |

(Continued)

FOREIGN PATENT DOCUMENTS

WO 2018035176 A1 2/2018

OTHER PUBLICATIONS

ISA/KR, Korean Intellectual Property Office (KIPO), International Search Report and Written Opinion dated Oct. 25, 2017, related PCT international application No. PCT/US2017/047037, pp. 1-11, claims searched, pp. 12-17.

(Continued)

*Primary Examiner* — Seahee Hong
(74) *Attorney, Agent, or Firm* — O'Banion & Ritchey LLP; John P. O'Banion

(57) ABSTRACT

A telescoping stabilization strut system generally comprising a fixturing pin system with accidental or inadvertent operation protection for providing stability and support between a bearing surface such as a ground surface and a load such as a vehicle, an aircraft, a machine, or a structure.

19 Claims, 12 Drawing Sheets

(56) References Cited

U.S. PATENT DOCUMENTS

| | | | | |
|---|---|---|---|---|
| 8,814,142 B2* | 8/2014 | Pasto | ................ | B66F 3/00 |
| | | | | 254/134 |
| 10,040,326 B1 | 8/2018 | O'Connell | | |
| 2006/0022426 A1 | 2/2006 | Clive-Smith | | |
| 2006/0062632 A1 | 3/2006 | Jang | | |
| 2009/0050771 A1 | 2/2009 | Horne | | |
| 2009/0184299 A1 | 7/2009 | Pasto | | |
| 2013/0092890 A1* | 4/2013 | Alanko | ................ | B60S 9/08 |
| | | | | 254/420 |

OTHER PUBLICATIONS

Paratech, "Twistlock Vehicle Stabilizer (TVS) System", document internal date of Dec. 21, 2010, 6 pages, downloaded May 6, 2019 from https://www.paratech.com/sites/default/files/paratech_manuals_tvs.pdf.

Paratech, "TVS—TwistLock Vehicle Stabilizer", document internal date of Oct. 30, 2012, 1 page, downloaded May 6, 2019 from http://k12fd.com/prg/SYS03Download.php?ModuleType=MUL03&MID=00&Class=Documents&ItemID=12&file=Paratech%20TwistLock%20Vehicle%20Stabilization%20TVS.pdf.

Weber Rescue Systems, "Stab-Fast ALU", document internal date of Mar. 22, 2016, 2 pages, downloaded May 6, 2019 from https://www.weber-rescue.com/download/stabilisierung/Stab-Fast-MK2/Print/PR_Stab-Fast_ALU_EN.pdf.

Holmatro, "V-Strut", 2 pages, webpage downloaded May 6, 2019 from https://www.holmatro.com/en/rescue/innovations/latest-innovations/v-strut.

* cited by examiner

TELESCOPING STABILIZATION STRUT SYSTEM

CROSS-REFERENCE TO RELATED APPLICATIONS

This application claims priority to, and is a 35 U.S.C. § 111(a) continuation of, PCT international application number PCT/US2017/047037 filed on Aug. 15, 2017, incorporated herein by reference in its entirety, which claims priority to, and the benefit of, U.S. provisional patent application Ser. No. 62/375,497 filed on Aug. 16, 2016, incorporated herein by reference in its entirety. Priority is claimed to each of the foregoing applications.

The above-referenced PCT international application was published as PCT International Publication No. WO 2018/035176 A1 theon Feb. 22, 2018, which publication is incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to a rapidly deployable telescoping stabilization strut system, and more particularly to a telescoping stabilization strut system with accidental or inadvertent operation protection for providing stability and support between a bearing surface and a load.

2. Background Discussion

Over the years, motor vehicles have undergone major changes in both type and construction. Currently, crashes that use to leave vehicles on their wheels are now resulting in more rollovers that leave vehicles on their sides, roofs, or stacked in precarious positions. Passengers are being subjected to extreme bouncing and impact injuries particularly when not restrained by seat belts. Hence, the need for vehicle stabilization during rescue operations has never been greater.

SUMMARY OF THE DISCLOSURE

This disclosure describes a telescoping stabilization strut system generally comprising a fixturing pin system with accidental or inadvertent operation protection for providing stability and support between a bearing surface such as a ground surface and a load such as a vehicle, an aircraft, a machine, or a structure. This disclosure further describes an integral strap assembly convertible between a wedge-type strut deployment configuration and a lifting-type strut deployment configuration. The telescoping stabilization system is relatively light in weight, strong, and easy to use, thereby eliminating extensive training while allowing rescue crews to stabilize complex problems easily. The telescoping stabilization system may include a telescoping composite strut body that is impervious to moisture thereby precluding the strut body from rusting and to chemicals including battery acids. Additionally, the telescoping composite strut body does not conduct electricity, which is an important feature when working around power lines, machinery, aircraft, collapsed structures, and hybrid gas electric vehicles. Furthermore, the telescoping stabilization system may include an integrated ratchet strap that can be configured both in a lifting configuration and a wedge configuration.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

Figure 1:
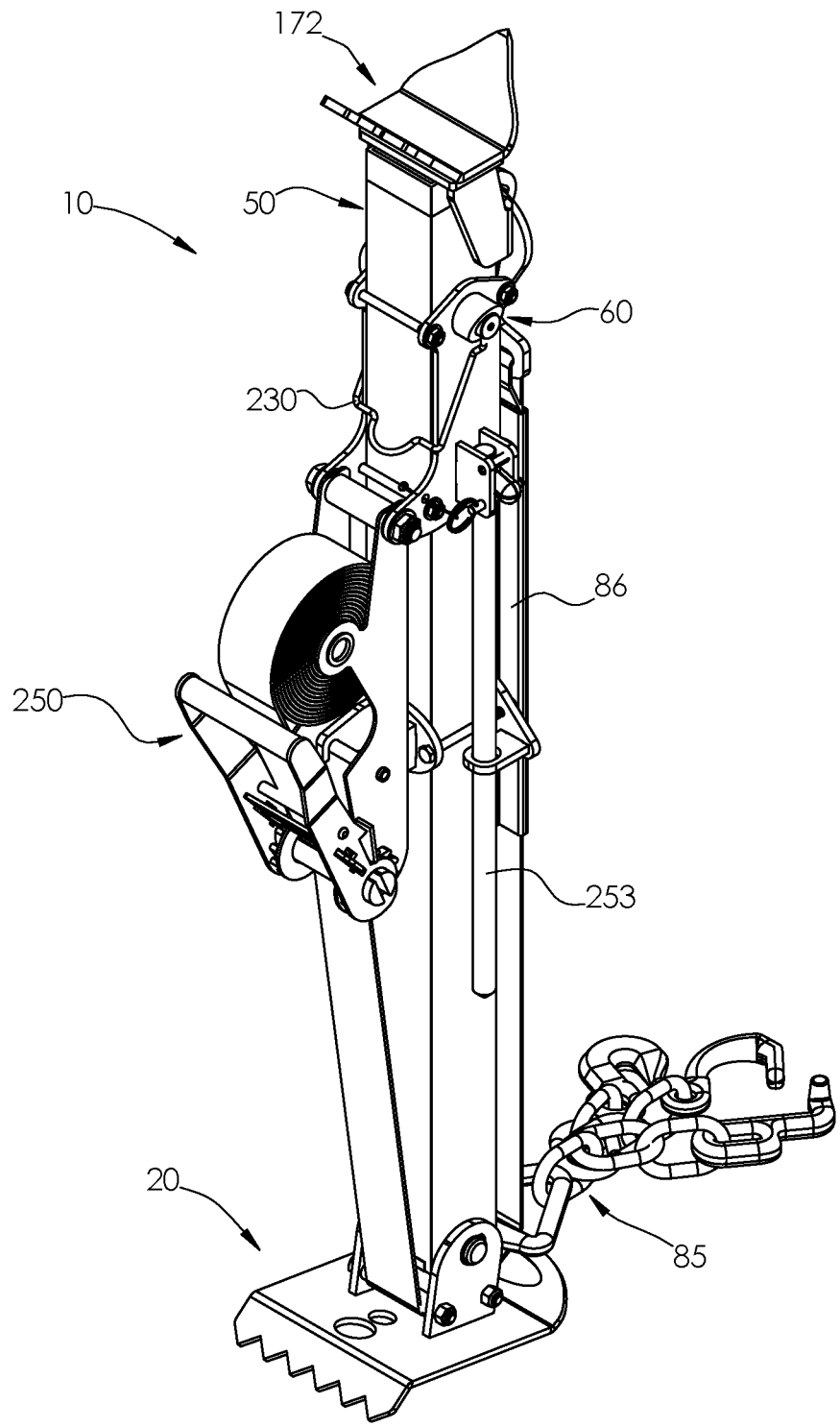
FIG. 1 is front and right side perspective view of an embodiment of a telescoping stabilization system assembled and in nested or collapsed position.

By way of example, and not of limitation, the technology of this disclosure comprises a telescoping stabilization strut system generally comprising a fixturing pin system with accidental or inadvertent operation protection for providing stability and support between a bearing surface such as a ground surface and a load such as a vehicle, an aircraft, a machine, or a structure. The system may also include an integral strap assembly convertible between a wedge-type strut deployment configuration and a lifting-type strut deployment configuration. These and other embodiments will now be described with reference to the drawing figures for a better understanding of the description.

1. Strut Base

Figure 2:
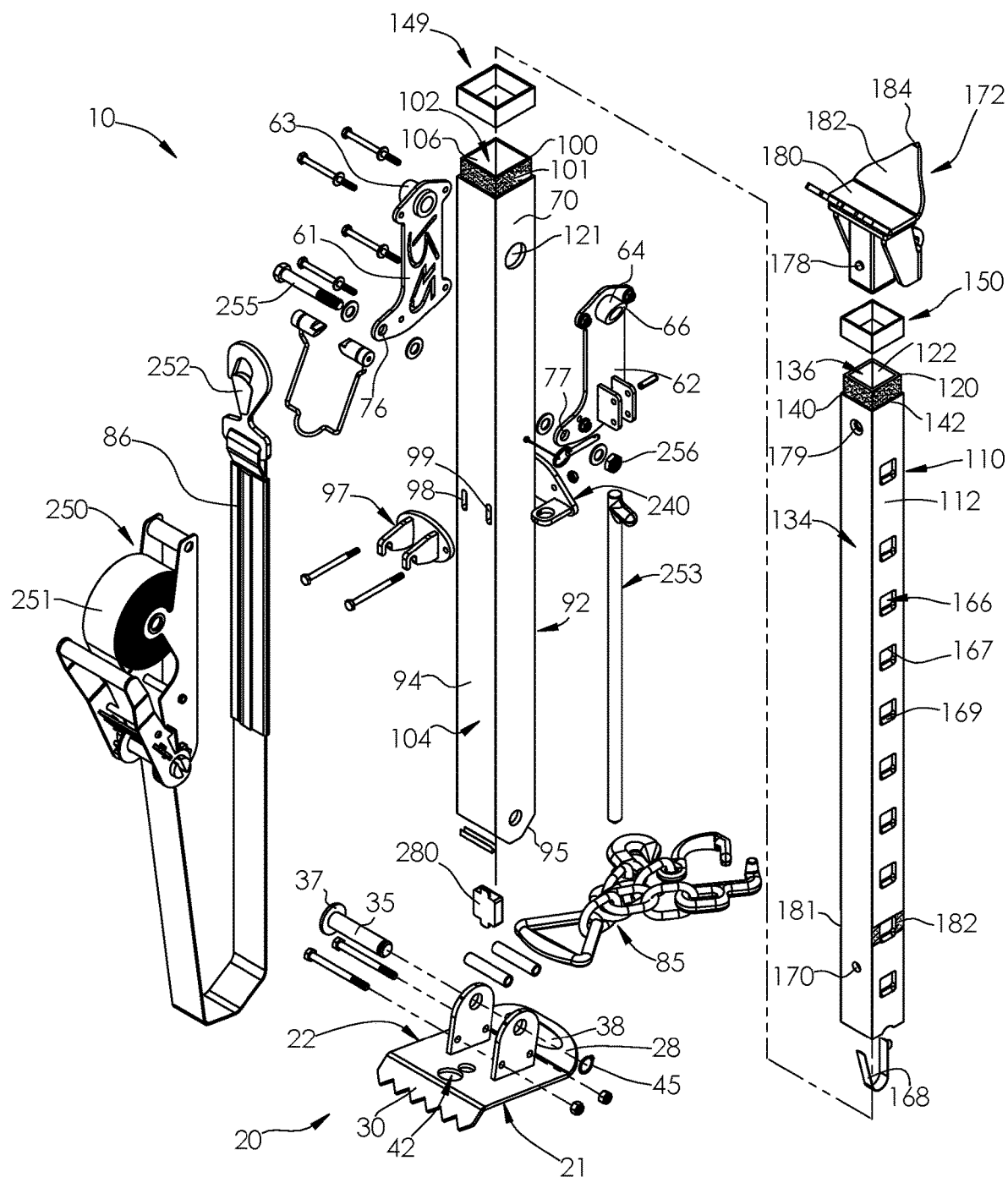
FIG. 2 is an exploded parts perspective view the telescoping stabilization system.
Figure 3:
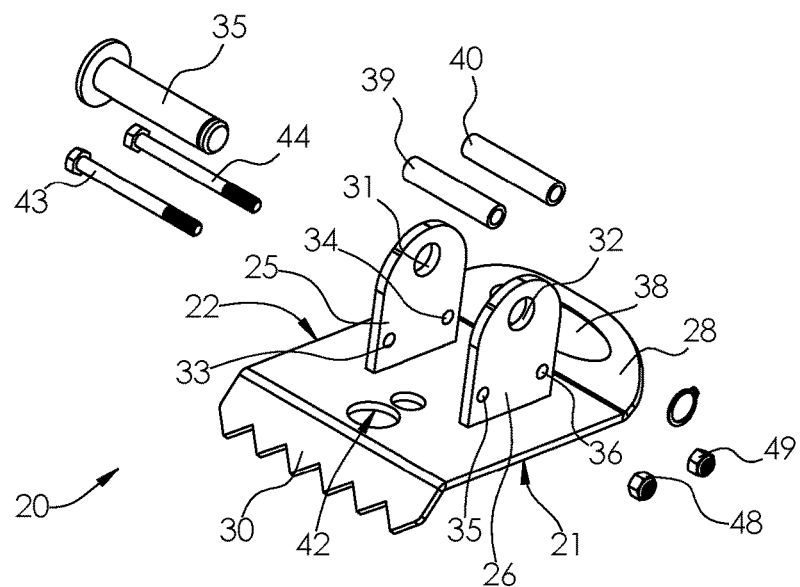
FIG. 3 is a partial sectional and a partial exploded parts plan view of the telescoping stabilization system base plate assembly.

More specifically, and referring to FIG. 1 through FIG. 3, one embodiment of the strut base 20 comprises a rectangularly shaped base plate having an upper surface 22, a lower surface 21, an upwardly turned forward end 28, and a downward turned rearward end 30.

Figure 8:
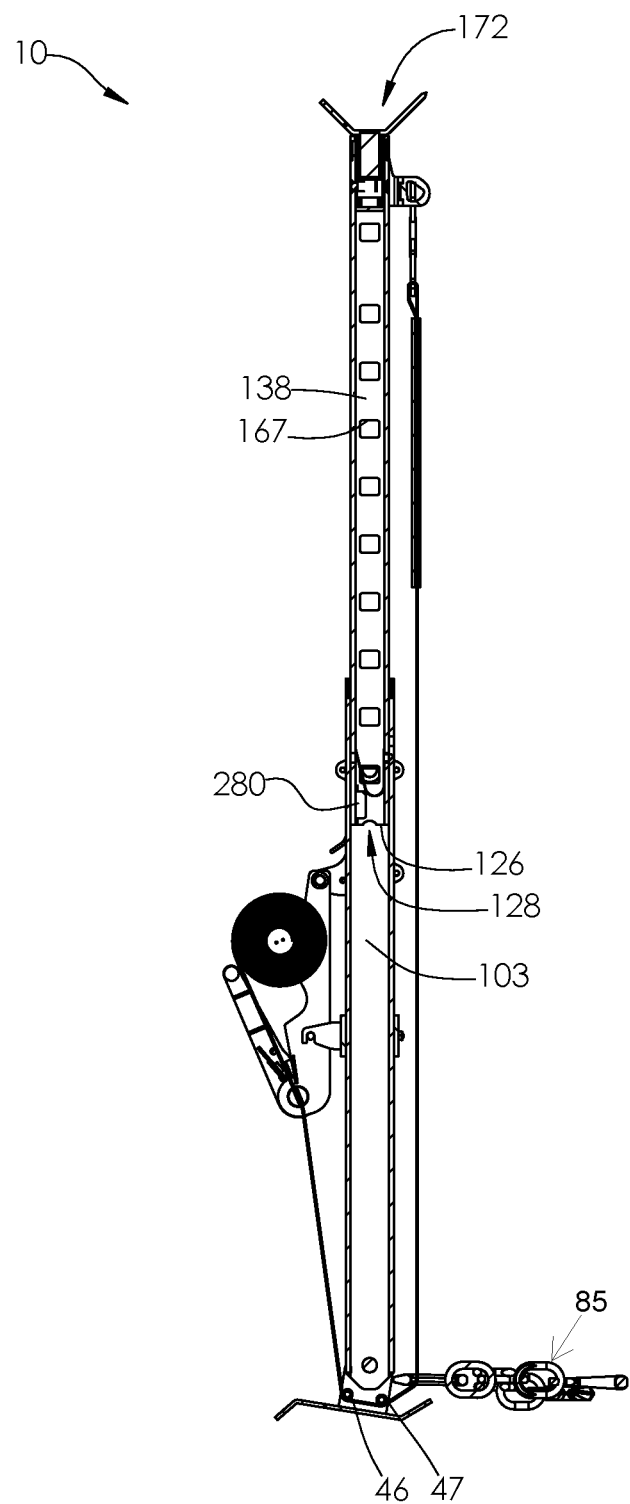
FIG. 8 is a cutaway view of a complete extended strut assembly.

In one embodiment, the upwardly turned forward end 28 has a radiused edge, while the downward turned rearward end 30 has a series of serrated teeth. Additionally, an elongated oval strap hole 38 is disposed in the upwardly turned forward end 28. The strut base 20 is further comprised of a pair of spaced apart upwardly extending flanges or ears 25 and 26 that are disposed at a substantially perpendicular angle with respect to the upper surface 22. Flange or ear 25 includes aperture 31 which is aligned with aperture 32 disposed in flange 26 to receive base plate pin 35. Flange or ear 25, also includes apertures 33,34 which are aligned with opposing apertures 35,36 disposed in flange 26 to receive a pair of roller bolts 43,44 and roller sleeves 39,40 to form strap roller assemblies 46,47 (FIG. 8). Moreover, a series of picket holes 42 are disposed through the strut base 20 at a location between the pair of projecting flanges or ears 25, 26 and the downward turned rearward end 30 of the strut base 20.

In one embodiment, the strut base 20 is constructed of, but not limited to, a steel material.

2. Telescoping Strut Body

Figure 14:
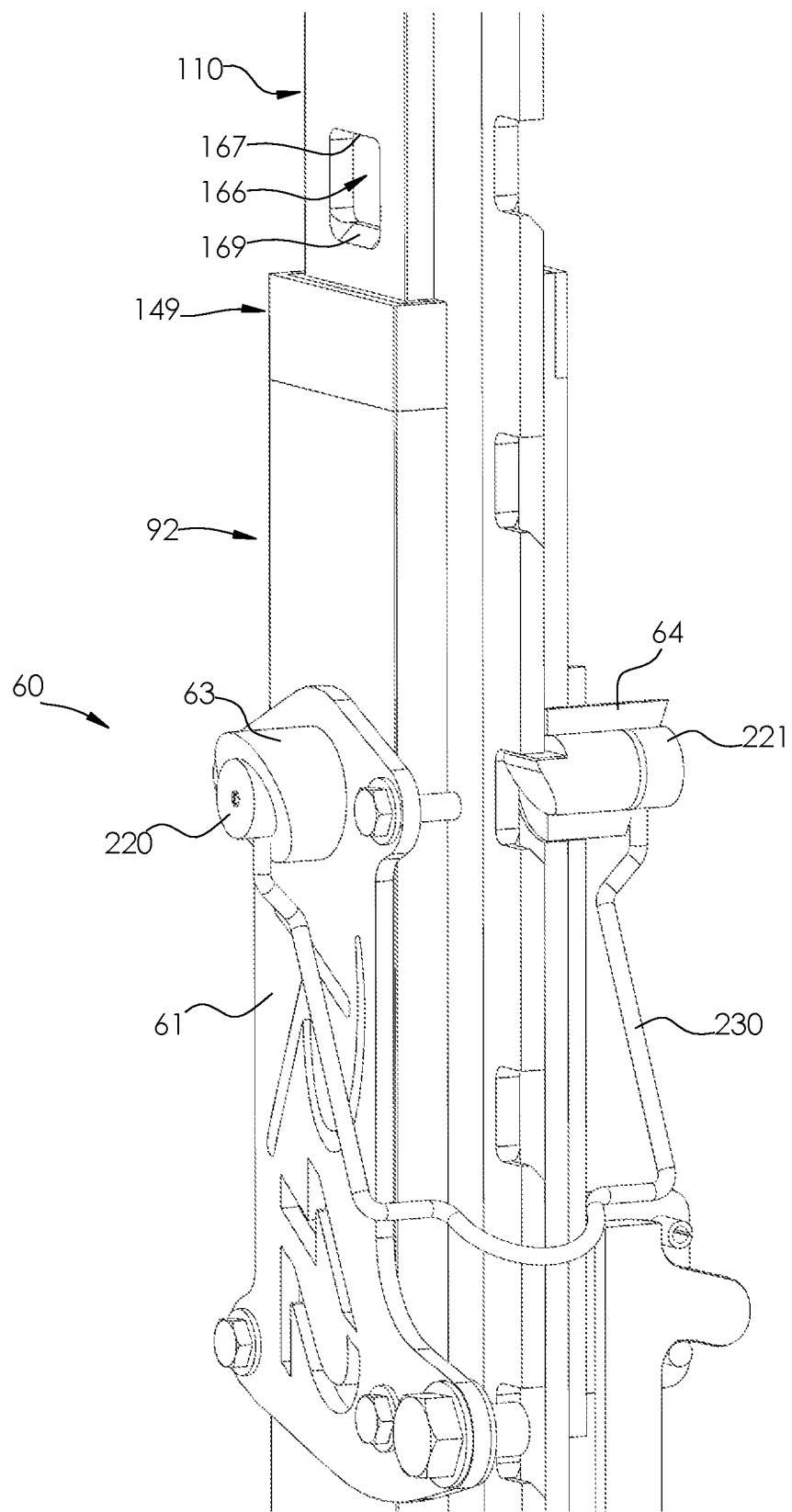
FIG. 14 is a cutaway view of a fixturing pin assembly in a normal load bearing position.
Figure 15:
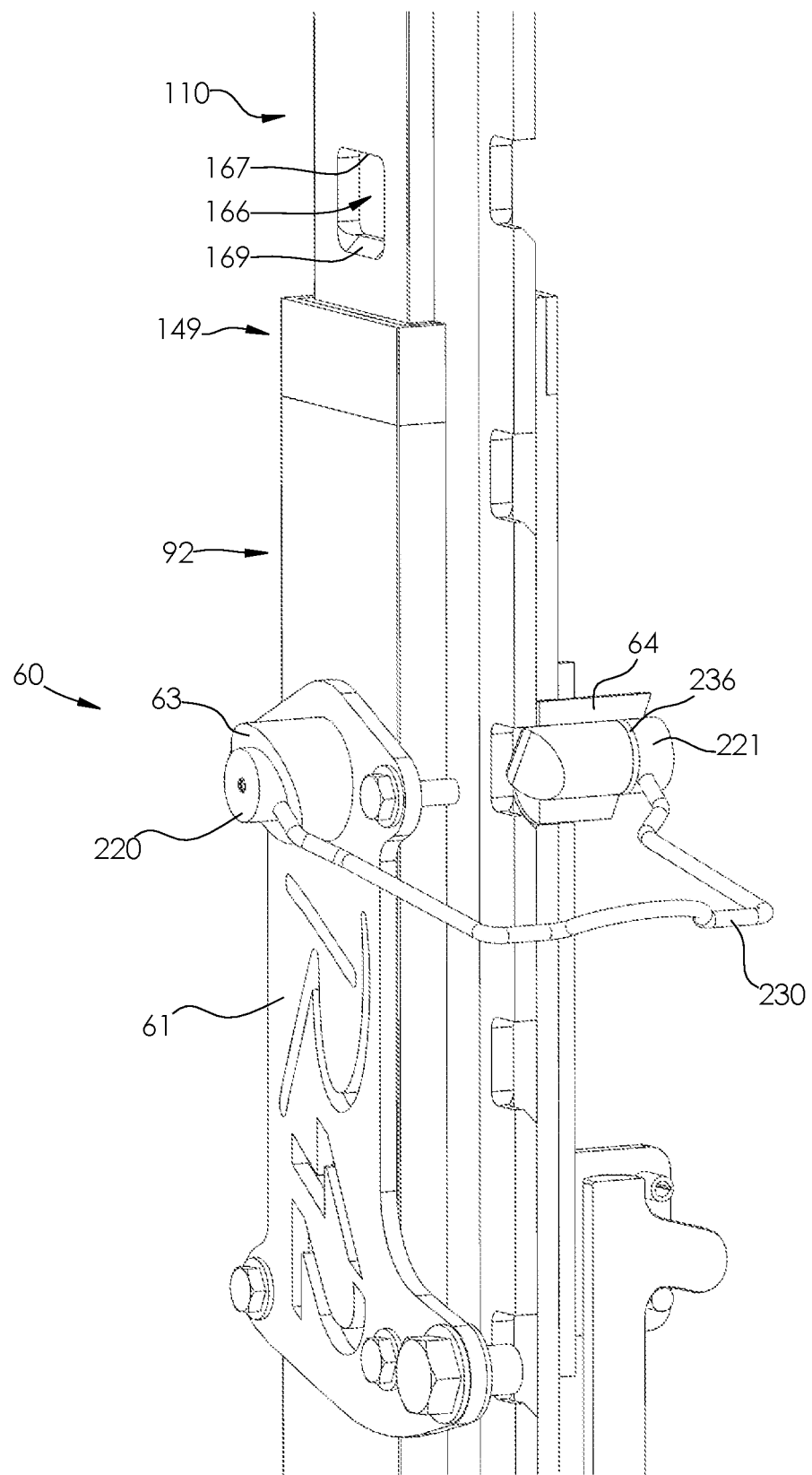
FIG. 15 is a cutaway view of a fixturing pin assembly partially positioned between the load and strut release positions.

Referring to FIGS. 1, 2, 8, 14, 15, 16, and 17, one embodiment of the telescoping strut body 50 comprises a lower strut member 92, and an upper strut member 110 dimensioned to be closely and slidably received within the lower strut member 92 (see FIG. 2, FIG. 15).

3. Upper Strut Member

Referring to FIGS. 2, 8, 9, 10, 11, and 14 through 17 the upper strut or tubular member 110 comprises an elongated rectangularly shaped sidewall 112 axially-extending between a substantially flat rectangularly shaped bottom surface 126 circumscribing and defining an open bottom end 128 and a substantially flat rectangularly shaped top surface 120 circumscribing and defining an open top end 122 of the upper strut member 110. The rectangularly shaped sidewall 112 includes a substantially flat exterior surface 134 and a substantially flat interior surface 136. The interior surface 136 defines a rectangularly shaped hollow passageway 138 axially extending through the upper strut member 110 between the bottom surface 126 and the top surface 120 of the upper strut member 110.

In one embodiment, the strut or tubular members 92, 110 are manufactured from a fiber reinforced material such as fiberglass, carbon fiber or DuPont™ Kevlar® reinforced material.

In one embodiment, the upper strut or tubular member is reinforced according to one or more of the techniques described in U.S. Pat. No. 8,113,479, the disclosure of which is incorporated herein by reference in its entirety. The rectangularly shaped sidewall includes a peripheral recess 140 having a predetermined depth. The peripheral recess 140 is located adjacent the open top end 120 of the upper strut member 110. In one embodiment, the peripheral recess 140 axially extends from the substantially flat rectangularly shaped top surface 120 to a substantially flat rectangularly shaped shoulder surface 142 located at a predetermined distance below the rectangularly shaped top surface 120 and substantially parallel thereto. Accordingly, the rectangularly shaped sidewall 112 of the upper strut member 110 is divided into a first rectangularly shaped sidewall section having a substantially uniform first sidewall thickness axially extending between the substantially flat rectangularly shaped bottom surface 126 of the upper strut member 110 to the substantially flat rectangularly shaped shoulder surface 142 and a second rectangularly shaped sidewall section defining a rectangularly shaped recessed sidewall section having a substantially uniform second sidewall thickness less than the first sidewall thickness and axially extending between the substantially flat rectangularly shaped shoulder surface 142 and the substantially flat rectangularly shaped top surface 120 of the upper strut member 110. The rectangularly shaped recessed sidewall includes an outer peripheral surface 144 recessed from the outer peripheral surface 134 of the first rectangularly shaped sidewall section and limiting the depth of the peripheral recess 140.

In one embodiment, the first sidewall thickness of the upper strut member 110 has a substantially uniform wall thickness of about of about one-quarter (¼) inch while the second sidewall thickness or the thickness of the recessed sidewall is about three-sixteenth (3/16) inch and thus, both the first rectangularly shaped sidewall section and the second rectangularly shaped sidewall section or rectangularly shaped recessed sidewall have a substantially uniform rectangular cross-section. The recess is about one-sixteenth (1/16) inch in depth when the first sidewall thickness is about one-quarter (¼) inch and the recessed sidewall is about three-sixteenth (3/16) inch. It is appreciated that the above dimensions are illustrative of one exemplary embodiment off the present descriptions, and dimensions may vary.

4. Reinforcement Band

Additionally, and referring to FIG. 2 and FIG. 9 through FIG. 11, the upper strut or tubular member 110 is further comprised of a rectangularly shaped reinforcement band 150 comprised of a rectangularly shaped sidewall 152 axially-extending between a substantially flat rectangularly shaped bottom surface 154 circumscribing and defining an open bottom end and a substantially flat rectangularly shaped top surface 156 circumscribing and defining an open top end of the reinforcement band 150. The rectangularly shaped sidewall 152 includes a substantially flat exterior surface 158 and a substantially flat interior surface 160. The substantially flat interior defines a rectangularly shaped open ended hollow passageway 162 axially extending through the reinforcement band 150 between the bottom surface 154 and the top surface 156.

In one embodiment, the rectangularly shaped sidewall 152 of the reinforcement band 150 has a substantially uniform wall thickness of about one-sixteenth (1/16) inch and thus, a substantially uniform rectangular cross-section.

Figure 10:
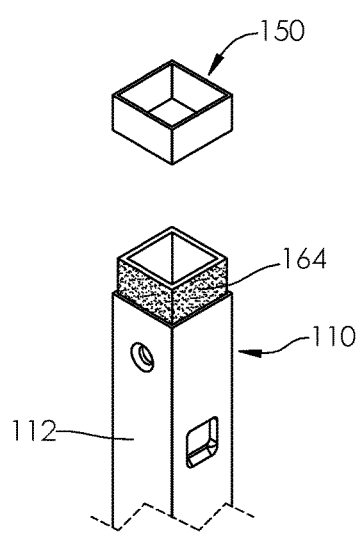
FIG. 10 is an exploded view of a reinforcement ring after adhesive application.

Referring to FIG. 10, and in one embodiment, a layer of adhesive 164 is applied between the interior surface 160 of the rectangular reinforcement band 150 and the outer peripheral surface 144 of the peripheral recess 140. The adhesive layer 164 can be formed by applying adhesive to the outer peripheral surface 144, to the interior surface 160 of the rectangular reinforcement band 150, or to both.

Figure 11:
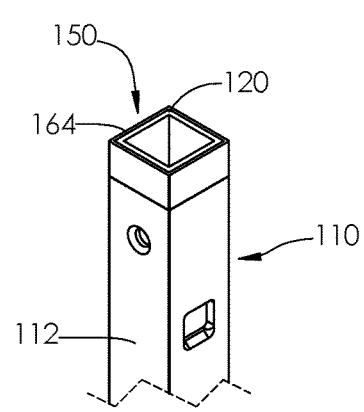
FIG. 11 is a view of an installed reinforcement ring.
Figure 12:
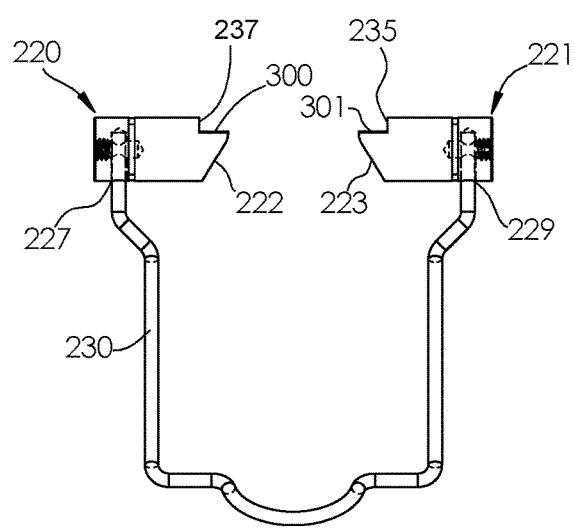
FIG. 12 is an assembled view of a complete fixturing pin assembly.
Figure 13:
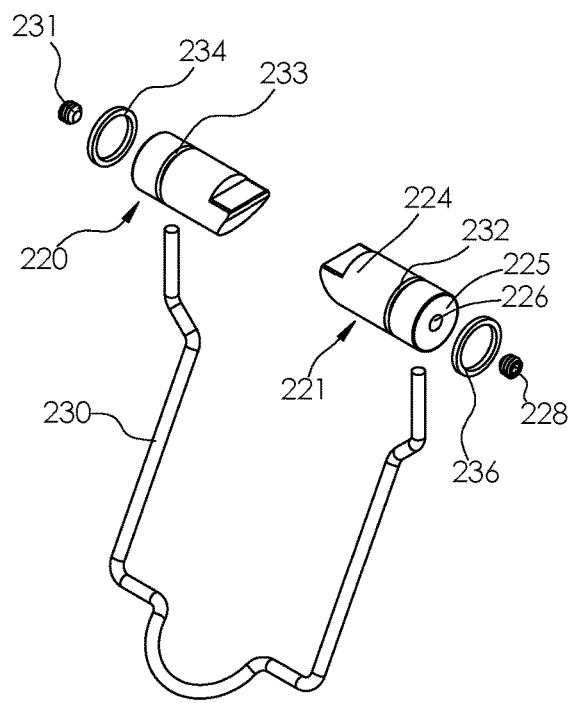
FIG. 13 is an exploded view of a complete fixturing pin assembly.

Referring to FIG. 11, and after the adhesive layer 164 is applied, the rectangular reinforcement band 150 is positioned within the peripheral recess 140 such that the interior surface 160 of the rectangular reinforcement band 150 circumscribes the outer peripheral surface 144 with the adhesive 164 interposed therebetween and such that the substantially flat rectangularly shaped bottom surface 154 of the reinforcement band 150 abuts with the substantially flat rectangularly shaped shoulder surface 142 of the upper strut member 110 while the substantially flat rectangularly shaped top surface 156 of the reinforcement band 150 sits flush with the substantially flat rectangularly shaped top surface 120 of the upper strut member 110.

Referring to FIGS. 1, 2, 9 and 11, once the reinforcement band 150 is positioned within the peripheral recess 140, the substantially flat exterior surface 158 of the rectangular reinforcement band 150 mates substantially flush with the substantially flat exterior surface 134 of the upper strut member 110 for allowing the upper strut member 110 with the attached rectangular reinforcement band 150 to fully telescope within the lower strut member 92 without substantial interference.

When the telescoping composite strut body 50 is extended, the rectangular reinforcement band 150 precludes lateral forces acting on the interior peripheral surface 122 proximate the open top end 136 from splitting the rectangularly shaped sidewall 112 of the upper strut or tubular member 110. These lateral forces are typically engendered when the telescoping composite strut body 50 is coupled between the strut base 20 and the strut head 172, extended, and under a side loading condition exemplified by force 210 (FIG. 18) along the length of the extended strut body 50 such as that provided by an abutment at a position along the length of the extended telescoping composite strut body 50 with an object such as a part of a vehicle.

In addition to providing reinforcement for upper strut or tubular member 110, the rectangular reinforcement band 150 has a depth substantially no greater than the depth of the rectangularly shaped peripheral recess 140 for being slidably received within the lower strut or tubular member 92 without substantial interference as noted above and illustrated in FIG. 1.

Referring to FIGS. 2, 12 and 14 through 17, the upper strut member 110 further comprises a series of spaced-apart pairs of adjustment apertures 166, with one aperture in each pair disposed through one side of the rectangularly shaped sidewall 112 of the upper strut member 110, and the other aperture in each pair disposed through an opposing side of the rectangularly shaped sidewall 112 of the upper strut member 110. The adjustment apertures 166 are generally rectangular in shape and comprise of a flat upper load bearing face 167 to conform with the flat upper load bearing surfaces 300, 301 of the fixturing pins 220, 221, and a chamfered lower face 169 providing a ramped surface to slidably contact the chamfered lower faces 222, 223 of the fixturing pins 220, 221 upon outward movement of the upper strut 110.

Accordingly, when the upper strut member 110 is extended from the lower strut member 92 of the adjustment aperture pairs 166 disposed in the upper member 110 is aligned with the strut pins 220, 221 inserted therethrough for adjusting the extension of the upper strut member 110 with respect to the lower strut member 92 thereby adjusting the extension of the telescoping composite strut body 50.

Figure 7:
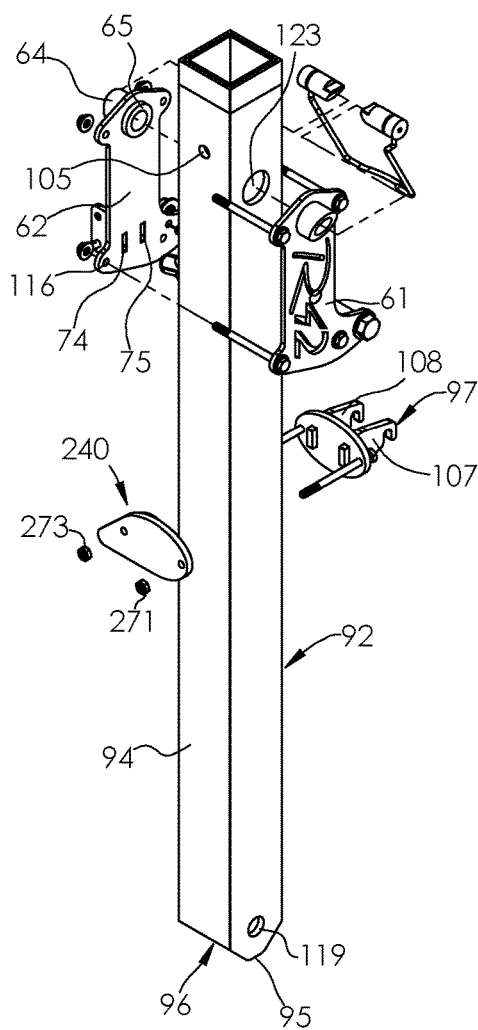
FIG. 7 is a partial sectional and a partial exploded parts plan view of the rear and left side of the lower strut assembly.

Moreover, the upper strut member 110 includes an interlocking or indexing system comprised of a spring mounted button 168 mounted within the upper strut member 110 and extending through hole 170 in surface 112. The button 168 is received within a button aperture 105 (FIG. 7) disposed in the rectangularly shaped sidewall 94 of the lower strut member 92 when aligned for interlocking or indexing the upper strut member 110 relative to the lower strut member 92 thereby providing a stop to prevent the upper strut member 110 from being overextended and to allow the user to simply pull out as much of the upper strut member 110 as needed.

In addition, two overextension indicator bars 181,182 (FIG. 2) are formed by cutting shallow recessed channels in the outer walls of the upper strut tube 110 and filling them with a bright color of paint such as neon orange. The position of the overextension indicator bars 181,182 is such that they are not visible during normal operation of the strut system 10, but become visible during any extension of the upper strut member 110 past the stop limit as established by the spring mounted button 168 and associated indexing hole 105. The visibility of the overextension indicator bars 181, 182 will provide visual warning to the operator that an unsafe extension of the upper strut tube 110 has taken place and preclude implementation of an unsafe system.

5. Lower Strut Member

Referring to FIGS. 2, 6, 7, and 14 through 17, the lower strut member 92 comprises an elongated rectangularly shaped sidewall 94 axially-extending between a substantially oval shaped bottom surface 95 circumscribing and defining an open bottom end 96 and a substantially flat rectangularly shaped top surface 100 circumscribing and defining an open top end 106 of the lower strut member 92. The rectangularly shaped sidewall 94 includes a substantially flat exterior surface 104 and a substantially flat interior surface 102. The interior surface 102 defines a rectangularly shaped hollow passageway 103 (FIG. 8) axially extending through the lower strut member 92 between the bottom surface 95 and the top surface 100 of the lower strut member 92. A hole is formed 105 through a single rectangularly shaped sidewall 94 to index with a spring mounted button 168 to prevent inadvertent overextension of the upper strut member 110.

Figure 9:
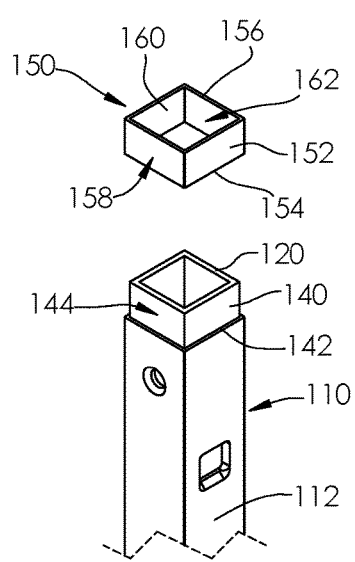
FIG. 9 is an exploded view of a reinforcement ring prior to adhesive application.

In one embodiment, the rectangularly shaped sidewall 94 of the lower strut member 92 has a substantially uniform wall thickness of about one-quarter (1/4) inch and thus, a substantially uniform rectangular cross-section. The lower strut member 92 also comprises a rectangular reinforcement ring 149 adhesively bonded within a machined pocket 101 on the upper end of the lower strut member 92 as described in detail in the upper strut member 110 (FIG. 9 through FIG. 11).

In one embodiment the lower strut member 92 contains a pair of opposed circular apertures 121, 123 disposed through two opposing sides of the rectangularly shaped sidewall 94 near the upper end of the lower strut member. The pair of apertures 121, 123 are sized to receive the sections of pin support tubes 63, 64, which extend through pin support side plates 61, 62 to provide a load bearing surface to translate the compressive force of the upper strut member 110 through the indexing pins 220, 221, through the pin support tubes 63, 64 to the lower strut member 92 for telescoped positional fixation of the upper strut member 110 in relation to the lower strut member 92.

Additionally, the lower strut member 92 contains a pair of milled strap support tab slots 98, 99 to receive and index the strap support plate 97.

In one embodiment, the lower strut member 92 further comprises a pair of opposed lower base apertures 118, 119 disposed through two opposing sides of the rectangularly shaped sidewall 94 adjacent the bottom surface 95 of the lower strut member 92 wherein the pair of lower base apertures 118, 119 allow a base plate pin 35 to be inserted therethrough. Additionally, the base plate pin 35 includes a welded flat head 37 and a base plate pin retainer 45 for locking the pin into position.

6. Strut Material

In one embodiment, the lower strut member 92 and the upper strut member 110 are all constructed of, but not limited to, a DuPont™ Kevlar® composite material which is a non-conductive composite material which provides a layer of protection against electrocution from batteries, hybrid/electric vehicle power systems, low hanging power lines, and other electrical hazards. Additionally, this material makes the telescoping composite strut body 50 nearly impervious to all types of environmental and chemically corrosive materials including water, salt, battery acid, fuels and UV rays. Furthermore, this material can be milled to form the recesses in portions of the strut members 92 and 110.

7. Reinforcement Band Material

Additionally, and in one embodiment, the rectangularly shaped reinforcement bands 149 and 150 are constructed of, but not limited to, an aluminum material. The bands can be formed from a strip of aluminum that is bent to shape and welded at its ends, machined from a mass of aluminum, or cut from an aluminum square tube.

8. Combination Strut Head

Figure 4:
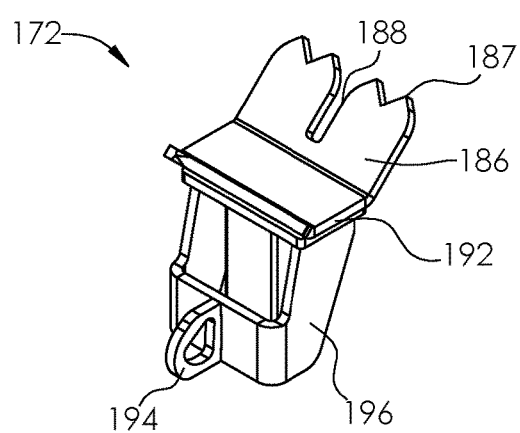
FIG. 4 is a front and right side perspective view of an embodiment of a multipurpose removable strut head.
Figure 5:
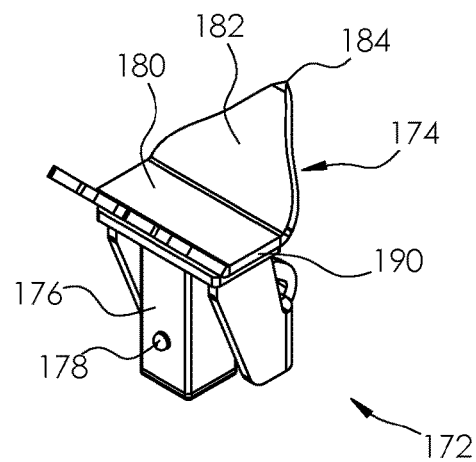
FIG. 5 is a rear and left side perspective view of an embodiment of a multipurpose removable strut head.
Figure 6:
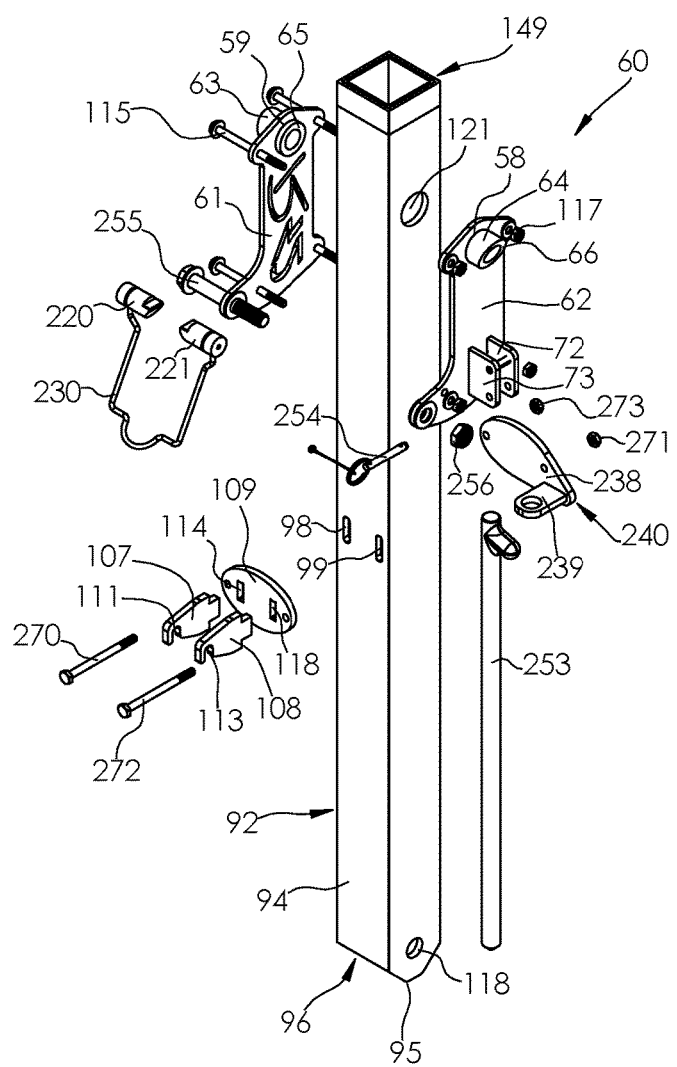
FIG. 6 is a partial sectional and a partial exploded parts plan view of the front and right side of the lower strut assembly.

Referring to FIGS. 2, 4 and 5, the telescoping stabilization system 10 is further comprised of a strut head which, in one embodiment, is in the form of the combination strut head 172. The combination strut head 172 comprises a U-shaped plate 174 rotatably mounted on a lower rectangular shaft 176 having a spring mounted button 178 mounted therein. The lower rectangular shaft 176 is received through the open upper end 136 and into the upper strut member 110 adjacent the rectangular reinforcement band 150 until the spring button 178 indexes or interlocks with an aperture 179 disposed through the sidewall 112 of the upper strut member 110. The U-shaped plate 174 includes a flat rectangularly shaped center portion 180 transitioning on one side to an upwardly turned spade shaped section 182 terminating to a point 184 and transitioning on an opposing side to an upwardly turned generally rectangularly shaped section 186 bifurcated by a medial notch or chain slot 188 and including a series of distal points 187. The flat rectangularly shaped center portion 180 includes two spaced apart substantially parallel sides 190 and 192. The combination strut head 172 is further comprised of a strap eye 194 welded to a strap eye support plate 196.

9. Fixturing Pin Support Plates

Referring to FIGS. 2, 6, 7, and 12 through 17, the telescoping stabilization system 10 is further comprised of a novel fixturing pin system 60 for telescopically positioning the upper strut member 110 within the lower strut member 92. In one embodiment, two pin support plates 61, 62 are formed by cutting flat material with, for example, a laser from typically aluminum, steel or stainless steel. Two pin support tubes 63, 64 are formed by cutting sections from a thick-walled aluminum, steel or stainless steel pipe section sized to slidably receive the strut fixturing pins 220, 221. An interior face 65 of the pin support tubes 63, 64 is cut to produce a flat surface perpendicular to the wall of the pin support tubes 63, 64. A sloped outer face 66 of the of the pin support tubes 63, 64 is formed by cutting the pipe at an angle, for example 20 degrees from perpendicular with a range from 10 degrees to 30 degrees, to produce a ramped surface. The pin support tubes 63, 64 are indexed within holes formed in the pin support plates 61, 62 such that the lowest point of the sloped outer face 66 will be positioned toward the base of the lower tube member 92. The pin support tubes 63, 64 are then affixed to the pin support plates 61, 62, typically by a welding process such as TIG welding. The pin support plates 61, 62 are also comprised of several pairs of holes 116 to accommodate fixturing bolts 115. The pin support plates are cut to form opposing bolt holes 76, 77 for affixing a ratchet strap mechanism 250. One pin support plate 62 further comprises a pair of stake head indexing plates 72, 73 weldably affixed within indexing slots 74, 75 cut into one pin support plate 62 to accommodate mounting and carrying of a strut base plate 20 fixturing ground insertable stake 253.

10. Strut Fixturing Pins and Spring

Referring to FIGS. 1, 6, 7 and 12 through 17, a pair of strut fixturing pins 220, 221 are formed in one embodiment by machinery such as CNC lathes, mills and screw machines from stock such as aluminum, steel or stainless steel. The strut fixturing pins 220, 221 are preferably identical. In a preferred configuration, the pins 220, 221 comprise a cylindrical body 224 of about ¾" diameter, a flat outer face 225 with a set screw hole 226 centrally drilled and tapped through the end of the cylindrical body 224 to receive a threaded set screw 228, 231, a pin spring hole 227, 229 sized to receive the pin spring 230 drilled through the side of the cylindrical body 224 and intercepting the set screw hole 226, a machined safety indicator O-ring channel 232, 233 circumferentially located next to the pin spring hole 227, 229, a brightly colored (e.g. orange) O-ring 234, 236 positioned within the machined safety indicator O-ring channel 232, 233, a sloped pin face 222, 223 formed on the lower portion of the inner end of the strut fixturing pins 220, 221, a flat load bearing face 300, 301 formed on the upper side of the strut fixturing pins 220, 221, and a flat vertical pin safety stop 235, 237 formed at the transition between the load bearing face 300, 301 and the cylindrical body 224. A pin spring 230 is formed from typically steel, spring steel or stainless steel sized to be inserted into the pin spring hole 227, 229.

11. Strap and Stake Support Plates

Referring to FIGS. 1, 2, 4, 5 and 6, a ratchet strap support bracket 97 is formed of typically laser cut aluminum, steel or stainless steel flat plate. The ratchet strap support plate 109 comprises two slots 114, 118 to receive the ratchet strap support tabs 107, 108, which are welded to the ratchet strap support plate 109. The ratchet strap support tabs 107, 108 extend through the ratchet strap support plate 109 so as to be receivable into the ratchet strap support tab slots 98, 99 formed in the lower strut member 92 to positionally index the ratchet strap support bracket 97 on the lower tube member 92. The ratchet strap support tabs 107, 108 have two ratchet strap support notches 111, 113 to engage an internal structure within the ratchet strap mechanism 250 to positionally support the ratchet strap mechanism 250 on the lower strut member 92.

A stake support bracket 240 is formed of typically laser cut aluminum, steel or stainless steel. It comprises a stake support base plate 238 and a stake support tab 239 welded to the stake support base plate 238. Both the stake support bracket 240 and the ratchet strap support bracket 97 have mounting bolt holes to receive mounting bolts 270, 272 and nuts 271, 273 to mount the strap support plate 97 and the stake support plate 240 to the lower strut member 92.

12. Ratchet Strap

Referring to FIGS. 1, 2 and 8, a self-contained ratchet strap mechanism 250 is bolted to the ratchet support holes 76, 77 on the pin support plates 61, 62 with bolt 255 and nut 256. The ratchet strap mechanism 250 is further affixed to the lower strut member 92 by engaging an interior portion of the ratchet strap mechanism 250 with ratchet strap support slots 111, 113 in the ratchet strap support tabs 107, 108 attached to the ratchet strap support plate 109. A ratchet strap 251 is inserted into the ratchet strap mechanism 250, threaded through the base plate 20, around the strap rollers 46, 47, through a hook cluster 85, a protective strap sleeve 86, and removably attached with a spring loaded strap hook 252 to the strap eye 194 on the strut head 172.

13. Assembly

Referring to FIGS. 2 through 8, 12 and 13, the pair of base apertures 118, 119 in the lower strut member 92 are pinned to the holes in the base plate ears 31, 32 using the steel base plate pin 35, which, in one embodiment, is a ¾" diameter steel base plate pin. The base plate pin is fixed with a base plate pin retainer clip 45. The two roller bolts 43, 44 are inserted through opposing flange holes 33, 34, 35, 36 and through roller sleeves 39, 40. The roller bolts 43, 44 are preferably affixed with nylock nuts 48, 49, or the like fastener. The ratchet strap support plate 97 is aligned with the ratchet strap support tabs 107, 108 inserted into the strap support tab slots 98, 99 in the lower strut member 92. The stake support plate 240 is aligned on the opposite side of the lower strut member 92 from the strap mounting plate 97 and the two plates are affixed together with mounting bolts 270, 272 and nylock nuts 271, 273. A base plate fixturing stake 253 is inserted through the hole in the stake support tab and the base plate fixturing stake 253 is pinned between the stake head indexing plates 72, 73 and pinned with a ball detent pin 254. The spring mounted button 178 on the combination strut head 172 is pushed and the combination strut head 172 is slid into the open top end of the upper strut member 110 until it stops and the spring mounted button 178 snaps into aperture 179 disposed through the sidewall 112 of the upper strut member 110. The telescoping upper strut member 110 is slideably inserted into the lower strut member 92 by passing the base of the upper strut member 110 through the upper end of the lower strut member 92 until it is fully inserted. The spring mounted interlock button 168 is depressed to allow insertion. The two fixturing pin support plates 61, 62 are placed onto the lower strut member 92 with the extended bases of the pin support tubes 63, 64 inserted into the opposed circular apertures 121, 123 in the lower strut member 92, which are bolted together with four fixturing bolts 115 and nylock nuts 117. Two orange or red safety O-rings 234, 236 are inserted into the safety indicator O-ring channels 232, 233 on the fixturing pins 220, 221. The two fixturing pins 220, 221 are inserted into the pin support tubes 63, 64. The ends of the pin spring 230 are inserted into the spring holes 227, 229 and are secured in place by screwing in and tightening the threaded set screws 228, 231. An inner structure of the ratchet strap mechanism 250 is aligned into the ratchet strap support notches 111, 113. The ratchet strap mechanism 250 is bolted to the ratchet strap support holes 76, 77 with a bolt 255 and nylock nut 256. The ratchet strap 251 is thread into the ratchet strap mechanism 250, between the base plate ears 25, 26, around the strap rollers 46, 47, through a hook cluster 85, a protective strap sleeve 86, and is removably attached with a spring loaded strap hook 252 to the strap eye 194 on the strut head 172.

14. Extension

Referring to FIGS. 1, 2, 8, 12, and 14 to 17, to extend the telescoping composite strut body 50, one simply pulls out on the combination head 172 until the desired amount of telescoping composite strut body is extended. As the lower ramped surface 169 of each pair of indexing holes 166 come in outwardly forced contact with the lower ramped surfaces 222, 223 of the fixturing pins 220, 221, the fixturing pins 220, 221 are forced outward through the strut pin support tubes 63, 64 against the spring pressure of the strut pin spring 230, clearing the fixturing pins 220, 221 from interference with the upper strut member 110 and allowing the upper strut member 110 to be extended to the required height.

Maximum extension of the telescoping upper strut member 110 is indexed by the spring button 168 as is also delineated above. Any overextension past the interlock will expose orange overextension safety bars 181, 182 on the upper strut member 110 indicating an unsafe condition. The strut system 10 may now be deployed in various ways known in the trade for stabilizing loads during various types of rescues (for example, FIG. 18).

15. Collapse

Figure 16:
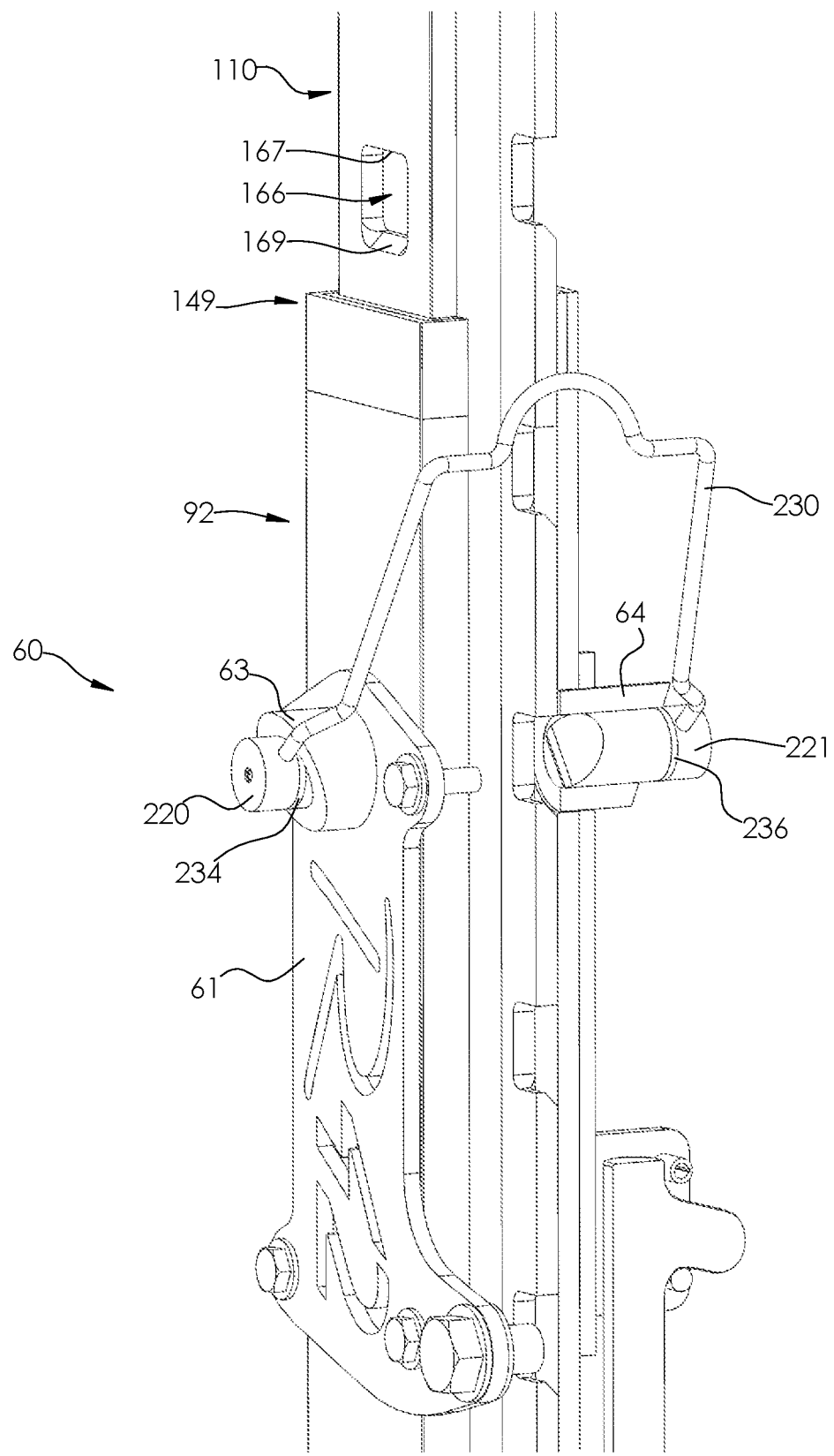
FIG. 16 is a cutaway view of a fixturing pin assembly in a strut release position.
Figure 17:
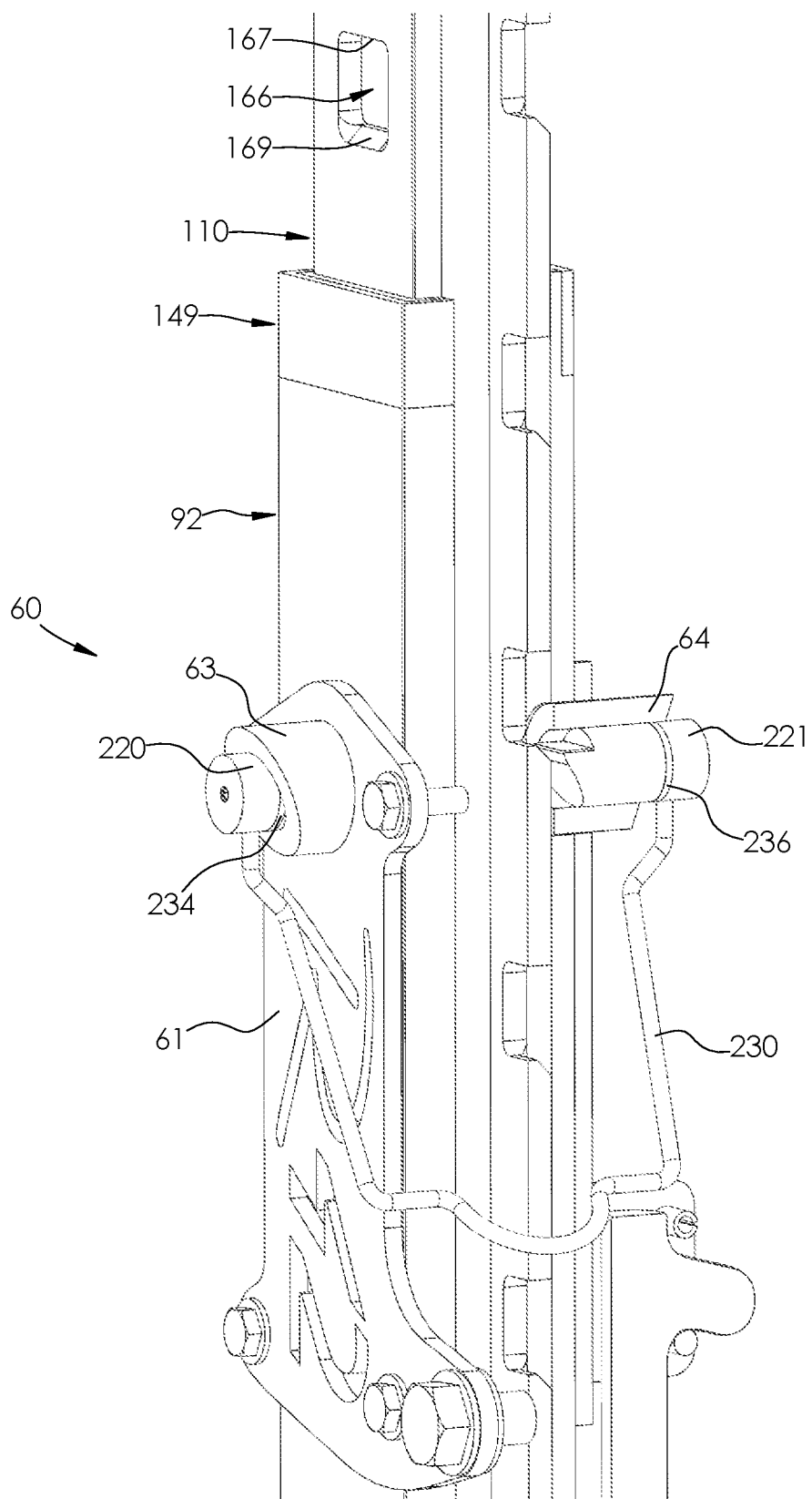
FIG. 17 is a cutaway view of a fixturing pin assembly automatically disengaged by extension of the upper strut section.

Referring to FIG. 14 through FIG. 16, to collapse the telescoping composite strut body 50 when not under load, one grasps the pin spring 230 and pulls it toward the upper end 100 of the lower strut member 92. This will cause the two fixturing pins 220, 221 to rotate, which forces the upper strut member 110 to telescopically extend slightly (see FIG. 15) as the shoulders of the flat fixturing pin load bearing faces 300, 301 push up against the top edge 167 of the strut indexing apertures 166. Simultaneous to this operation, the strut spring 230 will be sliding up the two sloped outer faces 66 of the pin support tubes 63, 64 thereby forcing the pin spring 230 to spread apart and pull the fixturing pins 220, 221 outward until they are no longer engaged with the strut indexing apertures 166 and allow the upper strut member 110 to telescopically slide down into the lower strut member 92 until seated in the fully collapsed storage position.

A novel safety feature of the system of the present description is that if there is any load on the upper strut member 110, the force of the upper strut member 110 pressing down on the load bearing junction between the flat load bearing surface 300, 301 of the fixturing pins 220, 221 and the flat top edges 167 of the strut indexing apertures 166 will prevent the strut spring 230 from rotating and pulling out the fixturing pins 220, 22. This prevents inadvertent collapse of the strut assembly 10, an occurrence that is possible in existing art systems. Any substantial load on the extended strut system 10 (e.g. over 50 Lbs.) will provide so much resistance to prevent fixturing pins 220, 221 from rotating that pin spring 230 will bend and fail before it can provide sufficient torque to cause the fixturing pins 220, 221 to rotate and retract from their load bearing position. This safety feature prevents the inadvertent operation of the pin spring 230 during a rescue, thereby protecting rescuers and victims from unintentional collapse of the stabilized load.

Should an implement such as a rescue tool or other device strike the outer end 225 of the fixturing pins 220, 221, the shear force applied to the pin spring 230 by the edge of the ramp 66 on the outer end of the pin support tube 63, 64 can begin to cut the pin spring 230. Without a safety feature, should enough force be applied there is a chance that the pin spring 230 might be completely severed, thereby causing the fixturing pin 220 or 221 to be driven too deeply into the pin support tube 63 or 64 and compromising the strength of the system. An additional novel safety feature of this design is the flat vertical pin safety stop 235, 237 on the fixturing pins 220, 221. When the strut 10 is under load, the upper edges 167 of the strut indexing apertures 166 are firmly pressed down onto the flat load bearing surfaces 300, 301 of the fixturing pins 220, 221 by the weight of the stabilized rescue load. Should the end of the fixturing pin 225 be struck as discussed above, the vertical pin safety stop 237 or 235 will come in contact with the outer face of the upper strut member 110 immediately above the strut indexing aperture 166 as the fixturing pin 220 or 221 tries to slide inward, stopping the fixturing pin 220 or 221 from unintentional overinsertion into the pin support tube 63 or 64, thereby protecting rescuers and victims from potential harm.

A further feature is that the orange safety overextension O-rings 234, 236 on the fixturing pins 220, 221 are only visible when the fixturing pins 220, 221 are retracted as during strut extension or collapse. Observation of visible safety overextension O-rings 234, 236 when the strut is going to be loaded provides warning to the operator that a fixturing pin 220 or 221 is not fully inserted to its load bearing position and that the strut is in an unsafe condition.

A further feature is that the orange overextension bars 181, 182 on the upper strut member 110 will slide out of the top of the lower strut member 92 if the upper strut member 110 is inadvertently extended past its safe height. Observation of the overextension bars 181, 182 indicates to the operator that the strut is in an unsafe configuration.

16. Use and Operation

Figure 18:
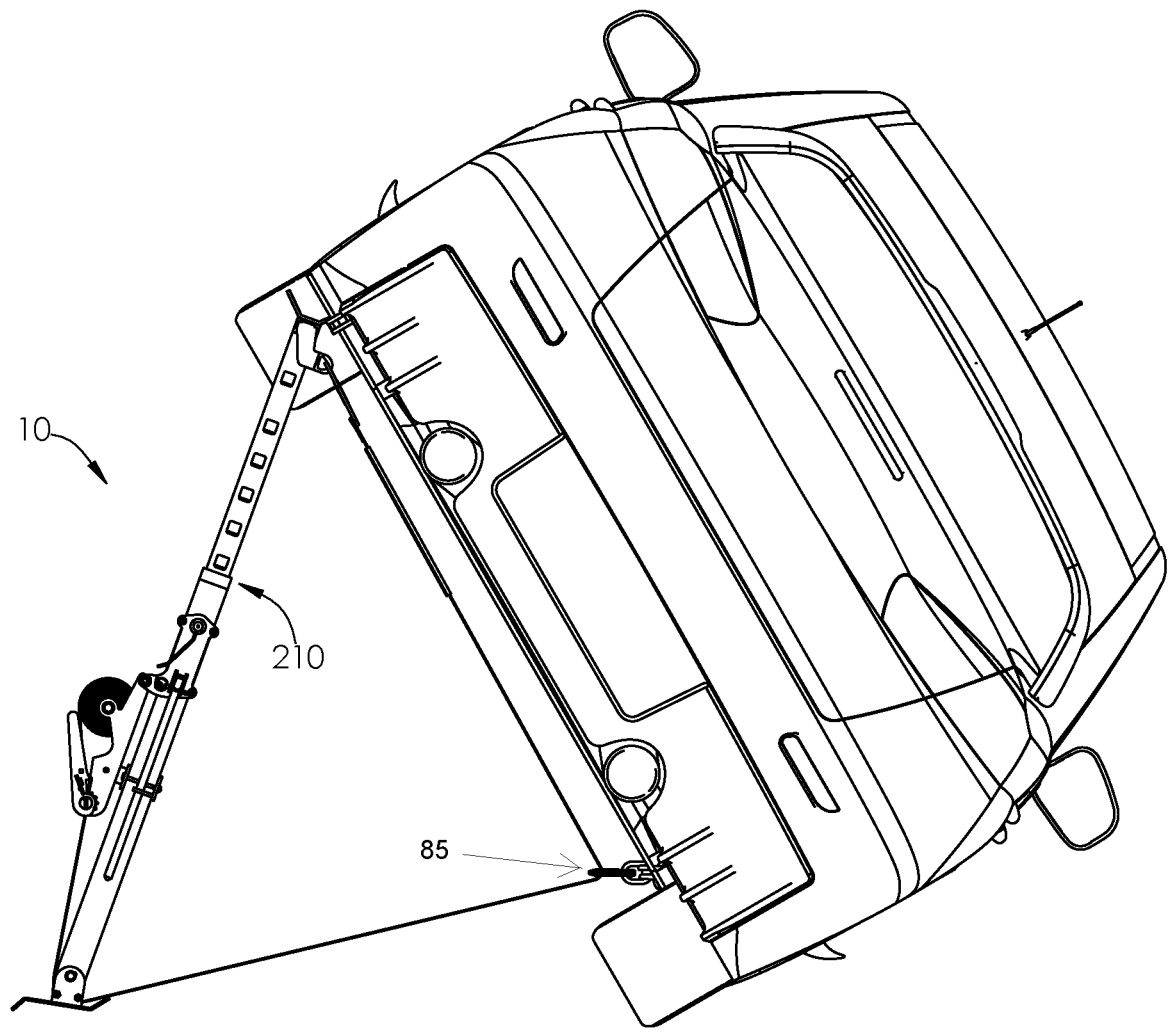
FIG. 18 is a view of a typical strut system deployment to stabilize an unstable crashed vehicle.

Referencing FIG. 18, in use and operation, one or more telescoping stabilization systems 10 can be employed in a variety of orientations to provide stabilization of, for example, one or more vehicles in a crash situation.

In the field, one or more telescoping stabilization systems 10 are typically preassembled as delineated above and ready to be employed. Thus, for a vehicle accident, the user first analyses the situation to establish a plan for patient extrication. In accordance with the plan, the user extends the telescoping strut body 50 which can be adjusted to a variety of lengths, so that it will end up between 45 degrees and 70 degrees relative to the vehicle when tightened with, for example, the ratchet strap 250. Then, the user anchors the combination head 172 against the vehicle. The combination head 172 rotates to grab at any angle and to prevent twisting of the struts. The U-shaped plate 174 of the head 172 will anchor almost anywhere and the notch or slot 188 is designed to grab edges or a chain. As a last resort, one can use the point 184 to penetrate the skin of vehicles such as cars, trucks, or aircraft to anchor the combination head 172. The point 184 may be driven into the material or placed into a preexisting hole.

With the combination head 172 firmly anchored, the user positions the strap 251 from the base plate 20 to the vehicle or to another strut base plate 20 and then tightens the ratchet strap 250 slightly. This process is repeated on the other side of the vehicle, and as many times as necessary until a desired number of telescoping stabilization systems 10 are in place. When all necessary telescoping stabilization systems 10 are in place, the user tightens the respective ratchet straps 250 until the desired stability is achieved.

Some possible scenarios for use and operation of the telescoping stabilization system 10 include stabilizing a vehicle on its side with two, three or four telescoping stabilization systems 10 being employed by placing one or two of the telescoping stabilization systems 10 against the bottom of the vehicle, one at the hood of the vehicle, and/or one at the trunk of the vehicle. In another scenario, a vehicle on its roof can employ two telescoping stabilization systems 10 deployed under the trunk of the car. The possible uses for the telescoping stabilization system 10 are virtually limitless.

In another aspect of use and operation, two telescoping stabilization systems 10 can employ chains with the combination strut heads 172 of the two systems by placing a portion of one end of the chain in one chain slot 188 of one strut head 172 and placing a portion of the other end of the chain in another chain slot 188 of another strut head 172 for building a saddle under a load between two telescoping stabilization systems 10. In one embodiment, $3/8$ inch 70 grade or 80 grade chains are employed. Chains can also be used with one or more telescoping stabilization systems 10 to control loads as the systems stabilize the loads.

In another aspect of use and operation, and if a user runs into a situation where the vehicle or the base plates are on a sloped or slippery surface, the user may drive the stake 253 or a separate picket through the picket holes 42 in the base plate 20 to anchor it firmly to the ground to prevent slippage.

Another embodiment incorporates an electronics module which is attached to the interior wall of the lower strut body and which is battery powered. This module may incorporate numerous measurement components which may include strain sensors to measure load on the strut, sonic sensors to warn operators when failure precursor microcracking is detected, angle measurement to indicate correct installation angle and warn of incorrect angle, motion sensors which can warn of unexpected movement, and other sensors as may be developed to measure other aspects of use. The electronics may contain an audible warning device and a radio capability to communicate with cell phones or other communications devices to transmit data and warnings. This could incorporate the family of communications protocols currently being classified as the Internet of Things (IoT).

These aspects, along with the above delineation of the telescoping stabilization system 10, including its use and operation, demonstrate the industrial applicability of this technology.

Accordingly, and in one aspect, an embodiment of the technology matches the capabilities of conventional systems by providing a telescoping stabilization system which is relatively light in weight, strong, and easy to use thereby eliminating extensive training while allowing rescue crews to stabilize complex problems easily. Additionally, and in one aspect, the telescoping stabilization system comprises a telescoping composite strut body which is impervious to moisture thereby precluding the strut body from rusting and to chemicals including battery acids.

In another aspect, the telescoping composite strut body does not conduct electricity which is extremely important when working around power lines, machinery, aircraft, collapsed structures, and hybrid gas electric vehicles.

Furthermore, and in one aspect, an embodiment of the technology provides a telescoping stabilization system with an integrated ratchet strap which can be configured both in a lifting configuration and a wedge configuration.

Additionally, in one aspect, an embodiment of the technology provides a pin and spring telescopic tube lock system with flat load bearing surfaces on the indexing pins which reduce or eliminate the chance of inappropriately collapsing the strut under load by reducing or eliminating the ability to accidently or inadvertently operate the spring/pin assembly under load.

Moreover, and in one aspect, the opposing pins have a vertical flat surface at the transition from flat load bearing surface to cylindrical tube-supported section that provides a positive stop to prevent the accidental impact shear of the pin spring and subsequent compromise of the load bearing capabilities of the strut.

From the description herein, it will be appreciated that that the present disclosure encompasses multiple embodiments which include, but are not limited to, the following:

1. A telescoping stabilization system, the system comprising: a first tubular member having an exterior peripheral surface; a second tubular member having an exterior peripheral surface; wherein the first tubular member is slideably engaged within the second tubular member; a plurality of spaced-apart pairs of apertures extending through two opposing surfaces of the first tubular member for fixing the first tubular member in telescopic position relative to the second tubular member; wherein each of the apertures has a first load-bearing surface substantially perpendicular to the exterior peripheral surface of the first tubular member, and a second beveled surface opposite the aperture from the first load-bearing surface first, the second beveled surface disposed at an angle with respect to the exterior peripheral surface of the first tubular member; a pair of opposing pins configured to slideably engage a pair of the spaced-apart pairs of apertures to fix the first tubular member in telescopic position relative to the second tubular member, the pair of opposing pins being axially biased to slide inward into the pair of apertures; wherein each of the opposing pins have a flat load-bearing surface to engage the first load-bearing surface of one of the apertures to support a compressive load on the tubular members while restricting rotation and withdrawal of the pins while under load; and wherein each of the opposing pins have a beveled plane on a surface of the pin opposing the flat load-bearing surface such that upon a tensile load applied to the first and second tubular members the beveled planes of the opposing pins slideably engage corresponding second beveled surfaces of the pair of apertures to force the pins outward from each of the pair of apertures, allowing the first tubular member to be extended out of the second tubular member without manually operating the pins.

2. The system of any preceding or following embodiment: wherein the opposing pins are coupled to each other via a u-shaped spring pin; and wherein the spring pin is sized to load the opposing pins axially inward from the second tubular member to generate said axial bias of the spring pins into the pair of apertures.

3. The system of any preceding or following embodiment: wherein the opposing pins are each housed within respective ramped support tubes such that the opposing pins pass through opposing surfaces of the second tubular member and are free to rotate within each respective support tube; and wherein manual rotation of the spring pin while the first and second tubular members are not under a compressive load affects a simultaneous rotation of the opposing pins and engagement of the spring pin on respective ramps on the ramped support tubes to retract the opposing pins outward from the first tubular member and pair of apertures.

4. The system of any preceding or following embodiment, wherein the spring pin is restrained from rotation while tubular members are under a compressive load, restraining the opposing pins from migrating outward from respective apertures.

5. The system of any preceding or following embodiment: wherein each of the opposing pins has an axially-located, color-coded indicator that is disposed within respective ramp support tubes while the opposing pins are located in their engaged axially-inward location with the first tube; and wherein the axially-located, color-coded indicators are visibly located external to respective ramp support tubes while the opposing pins are located in their non-engaged axially-outward location with the first tube.

6. The system of any preceding or following embodiment, wherein support tubes are coupled to respective pin support plates which are attached to opposing peripheral surfaces of the second tube.

7. The system of any preceding or following embodiment: wherein each of the opposing pins comprise a cylindrical body and a vertical transition face forming a stop at an axially inward-most location of the flat load bearing surface; and wherein said stop is configured to engage the exterior peripheral surface of the first tubular member to prevent the respective opposing pin from overextension into the first tubular member.

8. The system of any preceding or following embodiment, further comprising a ratchet strap assembly attached to the exterior peripheral surface of the second tubular member, the strap assembly having a strap configured to be routed between a lower end of the second tubular member, through a sliding assemblage of vehicle attachment hooks, and removably attached to a strut head assembly that is removably affixed to the top of the first tubular member.

9. The system of any preceding or following embodiment, further comprising a base pivotally coupled to a lower end of the second tubular member and strut head pivotally coupled to an upper end of the first tubular member, the compressive load configured to be exerted on the first and second tubular members through the strut head and base.

10. The system of any preceding or following embodiment, wherein the first tubular member and second tubular member both having a substantially rectangular cross-section, the second tubular member having an interior peripheral surface sized to receive the exterior peripheral surface of the first tubular member.

11. The system of any preceding or following embodiment, further comprising: at least one color-coded overextension indicator disposed on the outer peripheral surface of the first tubular member; overextension indicator being at a location along the length of the first tubular member corresponding to a maximum telescopic extension with respect to the second tubular member.

12. A telescoping stabilization system, the system comprising: a first tubular member having an exterior peripheral surface; a second tubular member having an exterior peripheral surface; wherein the first tubular member is slideably engaged within the second tubular member; a plurality of spaced-apart pairs of apertures extending through two opposing surfaces of the first tubular member for fixing the first tubular member in telescopic position relative to the second tubular member; wherein each of the apertures has a first load-bearing surface substantially perpendicular to the exterior peripheral surface of the first tubular member, and a second beveled surface opposite the aperture from the first load-bearing surface first, the second beveled surface disposed at an angle with respect to the exterior peripheral surface of the first tubular member; a pair of opposing pins configured to slideably engage a pair of the spaced-apart pairs of apertures to fix the first tubular member in telescopic position relative to the second tubular member, the pair of opposing pins being axially biased to slide inward into the pair of apertures; wherein each of the opposing pins have a flat load-bearing surface to engage the first load-bearing surface of one of the apertures to support a compressive load on the tubular members while restricting rotation and withdrawal of the pins while under load; wherein each of the opposing pins have a beveled plane on a surface of the pin opposing the flat load-bearing surface such that upon a tensile load applied to the first and second tubular members the beveled planes of the opposing pins slideably engage corresponding second beveled surfaces of the pair of apertures to force the pins outward from each of the pair of apertures, allowing the first tubular member to be extended out of the second tubular member without manually operating the pins; wherein each of the opposing pins comprise a cylindrical body and a vertical transition face forming a stop at an axially inward-most location of the flat load bearing surface; and wherein said stop is configured to engage the exterior peripheral surface of the first tubular member to prevent the respective opposing pin from overextension into the first tubular member.

13. The system of any preceding or following embodiment: wherein the opposing pins are coupled to each other via a u-shaped spring pin; and wherein the spring pin is sized to load the opposing pins axially inward from the second tubular member to generate said axial bias of the spring pins into the pair of apertures.

14. The system of any preceding or following embodiment: wherein the opposing pins are each housed within respective ramped support tubes such that the opposing pins pass through opposing surfaces of the second tubular member and are free to rotate within each respective support tube; and wherein manual rotation of the spring pin while the first and second tubular members are not under a compressive load affects a simultaneous rotation of the opposing pins and engagement of the spring pin on respective ramps on the ramped support tubes to retract the opposing pins outward from the first tubular member and pair of apertures.

15. The system of any preceding or following embodiment, wherein the spring pin is restrained from rotation while tubular members are under a compressive load, thereby restraining the opposing pins from migrating outward from respective apertures.

16. The system of any preceding or following embodiment: wherein each of the opposing pins has an axially-located, color-coded indicator that is disposed within respective ramp support tubes while the opposing pins are located in their engaged axially-inward location with the first tube; and wherein the axially-located, color-coded indicators are visibly located external to respective ramp support tubes while the opposing pins are located in their non-engaged axially-outward location with the first tube.

17. The system of any preceding or following embodiment, wherein support tubes are coupled to respective pin support plates which are attached to opposing peripheral surfaces of the second tube.

18. The system of any preceding or following embodiment, further comprising a ratchet strap assembly attached to the exterior peripheral surface of the second tubular member, the strap assembly having a strap configured to be routed between a lower end of the second tubular member, through a sliding assemblage of vehicle attachment hooks, and removably attached to a strut head assembly that is removably affixed to the top of the first tubular member.

19. The system of any preceding or following embodiment, further comprising a base pivotally coupled to a lower end of the second tubular member and strut head pivotally coupled to an upper end of the first tubular member, the compressive load configured to be exerted on the first and second tubular members through the strut head and base.

20. The system of any preceding or following embodiment, wherein the first tubular member and second tubular member both having a substantially rectangular cross-section, the second tubular member having an interior peripheral surface sized to receive the exterior peripheral surface of the first tubular member.

21. The system of any preceding or following embodiment, further comprising: at least one color-coded overextension indicator disposed on the outer peripheral surface of the first tubular member; overextension indicator being at a location along the length of the first tubular member corresponding to a maximum telescopic extension with respect to the second tubular member.

22. A telescoping stabilization system, the system comprising: (a) a first tubular member having an exterior peripheral surface and a substantially rectangular cross section; (b) a second tubular member having an exterior peripheral surface and a substantially rectangular cross section; (c) wherein the first tubular member is slidably engaged within the second tubular member; (d) a series of fixturing holes through two opposing surfaces of the first tubular member for fixing the first tubular member in telescopic position relative to the second tubular member; (e) a pair of opposing spring-loaded pins extending through ramped support tubes and passing through opposing surfaces of the second tubular member to engage the fixturing holes in the first tubular member to fix the first tubular member in telescopic position relative to the second tubular member; (f) each of the opposing pins having a flat load bearing surface to engage the fixturing holes to both support compressive load on the tubular members and to prevent rotation and withdrawal of the pins while under load; (g) each of the opposing pins having a cylindrical body and a vertical transition face between the flat load bearing surface and the cylindrical body of the pin which come into contact with the exterior peripheral surface of the first tubular member to prevent the pin from overextension into the first tubular member when struck with enough force to shear the pin spring; and (h) each of the opposing pins having a beveled plane on a bottom portion of the pin to allow lower edges of the fixturing holes in the first tubular member to force the pins outward against spring pressure allowing the first tubular member to be extended out of the second tubular member without manually operating the pins.

23. The system of any preceding or following embodiment, further comprising a ratchet strap assembly attached to the exterior peripheral surface of the second tubular member, the strap assembly having a strap configured to be routed between a lower end of the second tubular member, through a sliding assemblage of vehicle attachment hooks, and removably attached to a strut head assembly removably affixed to the top of the first tubular member.

24. A telescoping stabilization system, the system comprising: (a) a base; (b) a telescoping composite strut body; (c) the strut body comprising a lower strut tube having a lower end pivotally coupled to the base, and an upper strut tube telescopically received within the lower strut tube such that the telescoping strut body is adjustable between an extended position and a collapsed position; and (d) a spring and pin assembly attached to an external surface of the lower strut tube; (e) the spring and pin assembly comprising: (i) two opposing pins which are attached by a wire spring to force the pins toward each other; (ii) a pair of heavy walled pin support tubes welded to pin support plates which are attached to the lower tube; (iii) the pin support tubes having ramped ends to force the springs and pins apart when the pin spring is moved toward the head of the strut assembly; (iv) each pin having a flat load bearing surface to engage matching holes in the upper strut tube to fix the upper tube in telescopic relationship with the lower tube in order to support a columnar load while preventing the pins from rotation and removal under load; (v) each pin having a vertical surface externally adjacent to the load bearing flat section to prevent inadvertent over-insertion of the pin through the upper strut wall; and (vi) each pin having a beveled plane on a lower side of the pin to allow the lower edge of the upper strut tube holes to force the pins outward against spring pressure during unidirectional telescopic extension of the upper strut tube from the lower strut tube.

25. The system of any preceding or following embodiment, further comprising: a ratchet strap assembly attached to the surface of the lower strut tube; the strap assembly having an associated strap configured to be routed between the lower strut tube and the baseplate, through an assemblage of vehicle attachment hooks, and removably attached to a loop on a multipurpose swiveling strut head having a shaft releasably received within an upper end portion of the upper strut tube.

26. A telescoping stabilization system, the system comprising: (a) a first tubular member having an exterior peripheral surface; (b) a second tubular member having an exterior peripheral surface; (c) wherein the first tubular member is slidably engaged within the second tubular member; (d) a series of fixturing holes through two opposing surfaces of the first tubular member for fixing the first tubular member in telescopic position relative to the second tubular member; (e) a pair of opposing spring-loaded pins extending through ramped support tubes and passing through opposing surfaces of the second tubular member to engage the fixturing holes in the first tubular member to fix the first tubular member in telescopic position relative to the second tubular member; (f) each of the opposing pins having a flat load bearing surface to engage the fixturing holes to both support compressive load on the tubular members and to prevent rotation and withdrawal of the pins while under load; (g) each of the opposing pins having a cylindrical body and a vertical transition face between the flat load bearing surface and the cylindrical body of the pin which come into contact with the exterior peripheral surface of the first tubular member to prevent the pin from overextension into the first tubular member when struck with enough force to shear the pin spring; and (h) each of the opposing pins having a beveled plane on a bottom portion of the pin to allow lower edges of the fixturing holes in the first tubular member to force the pins outward against spring pressure allowing the first tubular member to be extended out of the second tubular member without manually operating the pins.

27. The system of any preceding or following embodiment, further comprising a ratchet strap assembly attached to the exterior peripheral surface of the second tubular member, the strap assembly having a strap configured to be routed between a lower end of the second tubular member, through a sliding assemblage of vehicle attachment hooks, and removably attached to a strut head assembly removably affixed to the top of the first tubular member.

28. A telescoping stabilization system, the system comprising: (a) a base; (b) a telescoping composite strut body; (c) the strut body comprising a lower strut tube having a lower end pivotally coupled to the base, and an upper strut tube telescopically received within the lower strut tube such that the telescoping strut body is adjustable between an extended position and a collapsed position; and (d) a spring and pin assembly attached to an external surface of the lower strut tube; (e) the spring and pin assembly comprising: (i) two opposing pins which are attached by a spring to force the pins toward each other; (ii) a pair of support tubes attached to pin support plates which are attached to the lower tube; (iii) the pin support tubes having ramped ends to force the springs and pins apart when the pin spring is moved toward the head of the strut assembly; (iv) each pin having a flat load bearing surface to engage matching holes in the upper strut tube to fix the upper tube in telescopic relationship with the lower tube in order to support a columnar load while preventing the pins from rotation and removal under load; (v) each pin having a vertical surface externally adjacent to the load bearing flat section to prevent inadvertent over-insertion of the pin through the upper strut wall; and (vi) each pin having a beveled plane on a lower side of the pin to allow the lower edge of the upper strut tube holes to force the pins outward against spring pressure during unidirectional telescopic extension of the upper strut tube from the lower strut tube.

29. The system of any preceding or following embodiment, further comprising: a ratchet strap assembly attached to the surface of the lower strut tube; the strap assembly having an associated strap configured to be routed between the lower strut tube and the baseplate, through an assemblage of vehicle attachment hooks, and removably attached to a loop on a multipurpose swiveling strut head having a shaft releasably received within an upper end portion of the upper strut tube.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A telescoping stabilization system, the system comprising:
    a first tubular member having an exterior peripheral surface;
    a second tubular member having an exterior peripheral surface;
    wherein the first tubular member is slideably engaged within the second tubular member;
    a plurality of spaced-apart pairs of apertures extending through two opposing surfaces of the first tubular member for fixing the first tubular member in a telescopic position relative to the second tubular member;
    wherein each of the apertures has a first load-bearing surface perpendicular to the exterior peripheral surface of the first tubular member, and a second beveled surface opposite from the first load-bearing surface, the second beveled surface disposed at an angle with respect to the exterior peripheral surface of the first tubular member;
    a pair of opposing pins configured to slideably engage a pair of the spaced-apart pairs of apertures to fix the first tubular member in the telescopic position relative to the second tubular member, the pair of opposing pins being axially biased to slide inward into the pair of apertures;
    wherein each of the opposing pins have a flat load-bearing surface to engage the first load-bearing surface of one of the apertures to support a compressive load on the first and second tubular members while restricting rotation and withdrawal of the opposing pins while under load;
    wherein each of the opposing pins have a beveled plane on a surface of the pin opposing the flat load-bearing surface such that upon a tensile load applied to the first and second tubular members the beveled planes of the opposing pins slideably engage corresponding ones of the second beveled surfaces of the pair of apertures to force the opposing pins outward from each of the pair of apertures, allowing the first tubular member to be extended out of the second tubular member without manually operating the opposing pins;
    wherein each of the opposing pins comprise a cylindrical body and a vertical transition face forming a stop at an axially inward-most location of the flat load bearing surface; and
    wherein said stop is configured to engage the exterior peripheral surface of the first tubular member to prevent the respective opposing pin from overextension into the first tubular member.

2. The system of claim 1:
    wherein the opposing pins are coupled to each other via a u-shaped spring pin; and
    wherein the spring pin is sized to load the opposing pins axially inward from the second tubular member to generate said axial bias of the opposing pins into the pair of apertures.

3. The system of claim 2:
    wherein the opposing pins are each housed within respective ramped support tubes such that the opposing pins pass through opposing surfaces of the second tubular member and are free to rotate within each respective ramped support tube; and
    wherein manual rotation of the spring pin while the first and second tubular members are not under the compressive load affects a simultaneous rotation of the opposing pins and engagement of the spring pin on respective ramps on the ramped support tubes to retract the opposing pins outward from the first tubular member and the pair of apertures.

4. The system of claim 3, wherein the spring pin is restrained from rotation while the first and second tubular members are under the compressive load, restraining the opposing pins from migrating outward from the respective pair of apertures.

5. The system of claim 3:
    wherein each of the opposing pins has an axially-located, color-coded indicator that is disposed within respective ramp support tubes while the opposing pins are located in their engaged axially-inward location with the first tubular member; and
    wherein the axially-located, color-coded indicators are visibly located external to respective ramp support tubes while the opposing pins are located in their non-engaged axially-outward location with the first tubular member.

6. The system of claim 3, wherein the ramped support tubes are coupled to respective pin support plates which are attached to opposing peripheral surfaces of the second tubular member.

7. The system of claim 1, further comprising a ratchet strap assembly attached to the exterior peripheral surface of the second tubular member, the ratchet strap assembly having a strap configured to be routed between a lower end of the second tubular member, through a sliding, and removably attached to a strut head assembly that is removably affixed to a top of the first tubular member.

8. The system of claim 1, further comprising a base pivotally coupled to a lower end of the second tubular member and a strut head rotatably coupled to an upper end of the first tubular member, the compressive load configured to be exerted on the first and second tubular members through the strut head and the base.

9. The system of claim 1, wherein the first tubular member and the second tubular member both having a substantially rectangular cross-section, the second tubular member having an interior peripheral surface sized to receive the exterior peripheral surface of the first tubular member.

10. The system of claim 1, further comprising:
    at least one color-coded overextension indicator disposed on the exterior peripheral surface of the first tubular member; the overextension indicator being at a location along the length of the first tubular member corresponding to a maximum telescopic extension with respect to the second tubular member.

11. A telescoping stabilization system, the system comprising:
a first tubular member having an exterior peripheral surface and a strut head rotatably coupled to an upper end of the first tubular member; a second tubular member having an exterior peripheral surface and a base rotatably coupled to a lower end of the second tubular member;
wherein the first tubular member is slideably engaged within the second tubular member;
a plurality of spaced-apart pairs of apertures extending through two opposing surfaces of the first tubular member for fixing the first tubular member in a telescopic position relative to the second tubular member;
wherein each of the apertures has a first load-bearing surface perpendicular to the exterior peripheral surface for the first tubular member, and a second beveled surface opposite from the first load-bearing surface, the second beveled surface disposed at an angle with respect to the exterior peripheral surface of the first tubular member;
a pair of opposing pins configured to slideably engage a pair of the spaced-apart pairs of apertures to fix the first tubular member in the telescopic position relative to the second tubular member, the pair of opposing pins being axially biased to slide inward into the pair of apertures;
wherein each of the opposing pins have a flat load-bearing surface to engage the first load-bearing surface of one of the apertures to support a compressive load on the first and second tubular members while restricting rotation and withdrawal of the opposing pins while under load;
wherein each of the opposing pins have a beveled plane on a surface of the pin opposing the flat load-bearing surface such that upon a tensile load applied to the first and second tubular members the beveled planes of the opposing pins slideably engage corresponding ones of the second beveled surfaces of the pair of apertures to force the opposing pins outward from each of the pair of apertures, allowing the first tubular member to be extended out of the second tubular member without manually operating the opposing pins;
wherein each of the opposing pins comprise a cylindrical body and a vertical transition face forming a stop at an axially inward-most location of the flat load-bearing surface; and
wherein said stop is configured to engage the exterior peripheral surface of the first tubular member to prevent the respective opposing pin from overextension into the first tubular member.

12. The system of claim 11:
wherein the opposing pins are coupled to each other via a u-shaped spring pin; and
wherein the spring pin is sized to load the opposing pins axially inward from the second tubular member to generate said axial bias of the opposing pins into the pair of apertures.

13. The system of claim 12:
wherein the opposing pins are each housed within respective ramped support tubes such that the opposing pins pass through opposing surfaces of the second tubular member and are free to rotate within each respective ramped support tube; and
wherein manual rotation of the spring pin while the first and second tubular members are not under the compressive load affects a simultaneous rotation of the opposing pins and engagement of the spring pin on respective ramps on the ramped support tubes to retract the opposing pins outward from the first tubular member and the pair of apertures.

14. The system of claim 13, wherein the spring pin is restrained from rotation while the first and second tubular members are under the compressive load, thereby restraining the opposing pins from migrating outward from the respective pair of apertures.

15. The system of claim 13:
wherein each of the opposing pins has an axially-located, color-coded indicator that is disposed within respective ramp support tubes while the opposing pins are located in their engaged axially-inward location with the first tubular member; and
wherein the axially-located, color-coded indicators are visibly located external to respective ramp support tubes while the opposing pins are located in their non-engaged axially-outward location with the first tubular member.

16. The system of claim 13, wherein the ramped support tubes are coupled to respective pin support plates which are attached to opposing peripheral surfaces of the second tubular member.

17. The system of claim 11, further comprising a ratchet strap assembly attached to the exterior peripheral surface of the second tubular member, the ratchet strap assembly having a strap configured to be routed between a lower end of the second tubular member, through a sliding hook cluster, and removably attached to a strut head assembly that is removably affixed to a top of the first tubular member.

18. The system of claim 11, wherein the first tubular member and the second tubular member both having a substantially rectangular cross-section, the second tubular member having an interior peripheral surface sized to receive the exterior peripheral surface of the first tubular member.

19. The system of claim 11, further comprising:
at least one color-coded overextension indicator disposed on the exterior peripheral surface of the first tubular member; the overextension indicator being at a location along the length of the first tubular member corresponding to a maximum telescopic extension with respect to the second tubular member.

* * * * *